(12) United States Patent
Kokubo et al.

(10) Patent No.: US 8,905,467 B2
(45) Date of Patent: Dec. 9, 2014

(54) SUNROOF APPARATUS

(71) Applicant: Aisin Seiki Kabushiki Kaisha, Kariya, Aichi-ken (JP)

(72) Inventors: Yusuke Kokubo, Toyota (JP); Jun Maruyama, Nagoya (JP); Yoji Nagashima, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/890,311

(22) Filed: May 9, 2013

(65) Prior Publication Data

US 2013/0307293 A1    Nov. 21, 2013

(30) Foreign Application Priority Data

May 17, 2012 (JP) ................................. 2012-113396
Mar. 21, 2013 (JP) ................................. 2013-058894

(51) Int. Cl.
*B60J 7/05* (2006.01)
*B60J 7/19* (2006.01)
*B60J 7/053* (2006.01)
*B60J 7/00* (2006.01)

(52) U.S. Cl.
CPC ............... *B60J 7/0084* (2013.01); *B60J 7/053* (2013.01)
USPC ........................................................ 296/213

(58) Field of Classification Search
CPC .................................. B60J 7/0084; B60J 7/05

USPC ........................................................... 296/213
See application file for complete search history.

(56) References Cited

U.S. PATENT DOCUMENTS 3,894,767 A * 7/1975 Schatzler et al. ............. 296/213
6,457,769 B2 * 10/2002 Hertel et al. .................. 296/217
6,913,311 B2 * 7/2005 Weiss et al. ................... 296/213

FOREIGN PATENT DOCUMENTS

| JP | 3-86624 | 4/1991 |
| JP | 3535184 | 6/1994 |
| JP | 3650327 | 5/2002 |

\* cited by examiner

*Primary Examiner* — Dennis H Pedder
(74) *Attorney, Agent, or Firm* — Finnegan, Henderson, Farabow, Garrett & Dunner, LLP

(57) ABSTRACT

A sunroof apparatus includes a supporting bracket configured to support a movable panel, the movable panel opening and closing an opening portion, a guide rail extending in a vehicle front/rear direction, a sliding member connected to the supporting bracket and driven to be movable along the guide rail, a driving member driving the sliding member and causing the movable panel to move upwardly and downwardly and to perform a sliding movement in the vehicle rear direction, a gutter member which extends in the vehicle width direction and is movable along the guide rail and an engaging/disengaging portion provided at the movable panel or at the supporting bracket and being disconnected from the gutter member in a fully-closed state and being connected to the gutter member in a tilt-down state.

7 Claims, 6 Drawing Sheets

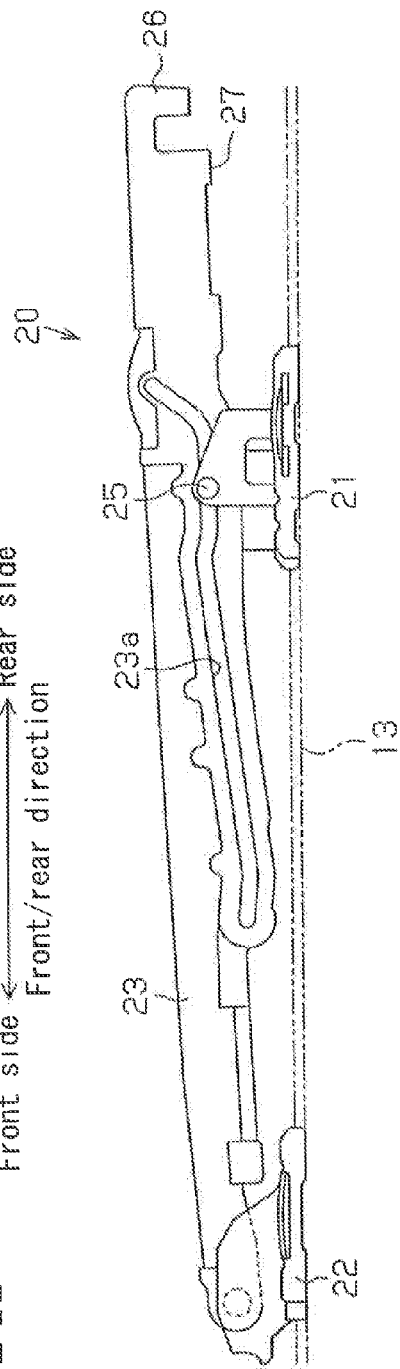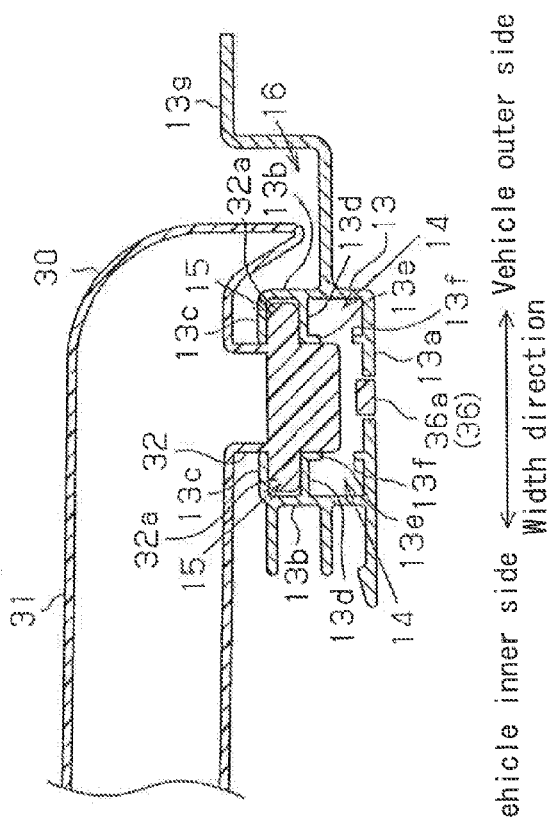

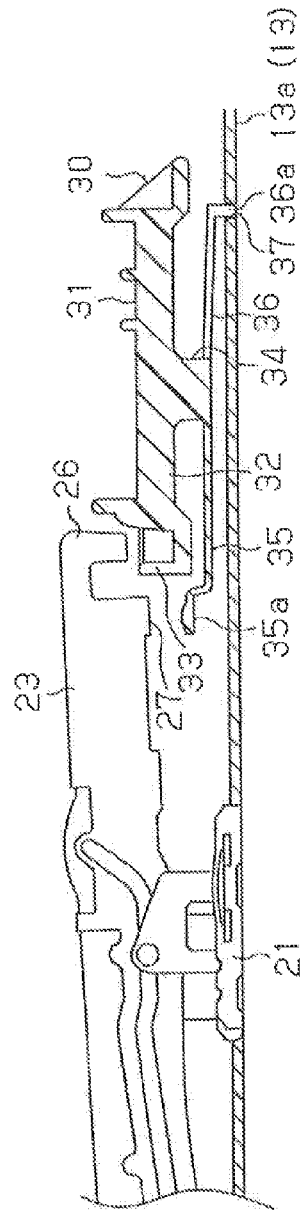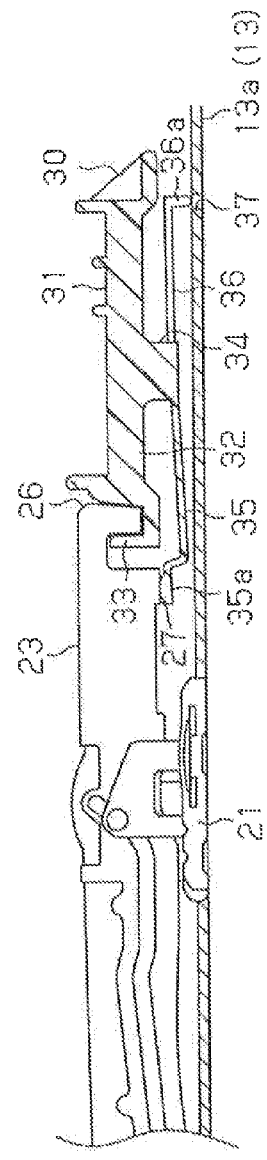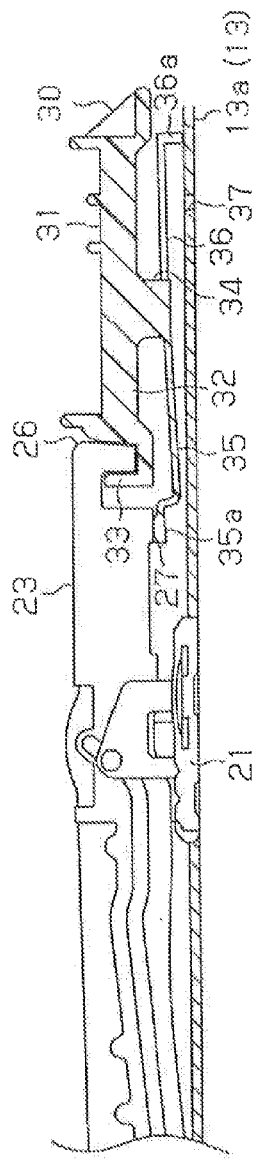
FIG. 2A  FIG. 2B  FIG. 2C

SUNROOF APPARATUS

CROSS REFERENCE TO RELATED APPLICATIONS

This application is based on and claims priority under 35 U.S.C. §119 to Japanese Patent Application 2012-113396, filed on May 17, 2012, and Japanese Patent Application 2013-058894, filed on Mar. 21, 2013, the entire content of which is incorporated herein by reference.

TECHNICAL FIELD

This disclosure generally relates to a sunroof apparatus

BACKGROUND DISCUSSION

A known inner-sliding type sunroof apparatus is disclosed in JP3650327B (hereinafter referred to as Patent reference 1). As illustrated in FIG. 8, the known sunroof apparatus disclosed in Patent reference 1 includes a guide rail 92 and a sliding member 93. The guide rail 92 is provided at each of edge portions, in a vehicle width direction, of an opening portion 91a formed at a roof portion 91 of a vehicle so as to extend in a vehicle front/rear direction. The sliding member 93 is provided to be slidable along the guide rail 92 in a vehicle front/rear direction. A movable panel 95 is connected to the sliding members 93 via respective function brackets 94.

When the sunroof apparatus having the above-described structure is in a fully-closed state (the state that is illustrated in FIG. 8) in which the movable panel 95 blocks or closes the opening portion 91a, in a case where the sliding members 93 move in the vehicle front direction, the movable panel 95, together with the function brackets 94, performs a tilt-up movement, that is, a rear portion of the movable panel 95 moves upwardly relative to or about a front portion of the movable panel 95. On the other hand, in a case where the sliding members 93 move in the vehicle rear direction in the fully-closed state, the movable panel 95 performs a tilt-down movement, that is, the rear portion of the movable panel 95, together with the function brackets 94, moves downwardly relative to or about the front portion of the movable panel 95. In a case where the sliding members 93 further move in the vehicle rear direction, the movable panel 95, together with the function brackets 94, performs a sliding movement in the vehicle rear direction while the movable panel 95 being maintained in a tilt-down state, so that the opening portion 91a is opened.

According to the known sunroof apparatus disclosed in Patent reference 1, a gutter member 96 for guiding water, which drops down from the movable panel 95, to the guide rails 92 is pivotably connected to a rear end portion of the function brackets 94. More specifically, the gutter member 96 includes a gutter body 96a formed in a substantially U-shape and extending in the vehicle width direction along a rear end portion of the movable panel 95. The gutter member 96 includes a connected portion 96b which extends from each of end portions of the gutter body 96a in the vehicle width direction toward the vehicle front direction and is pivotably connected to the rear end portion of the corresponding function bracket 94. In addition, the gutter member 96 includes a shoe portion 96c extending from each of the end portions of the gutter body 96a in the vehicle width direction toward the vehicle rear direction. Each of the shoe portions 96c is provided at the corresponding guide rail 92 so as to be pivotable, and so as to be movable in the vehicle front/rear direction.

Accordingly, for example, when the movable panel 95 performs a tilt movement, the gutter member 96 follows the tilt movement of the movable panel 95 and tilts in a manner that a front portion of the gutter member 96 moves upwardly/downwardly relative to a rear portion (that is, the shoe portions 96c) of the gutter member 96. On the other hand, when the movable panel 95 performs the sliding movement, the gutter member 96 performs the sliding movement integrally with the movable panel 95.

According to the known sunroof apparatus disclosed in Patent reference 1, for example, the gutter member 96 tilts in a manner that the gutter member 96 rises up by following the tilt-up movement of the movable panel 95. Thus, the gutter member 96 is easily viewed from an inside/outside of a vehicle cabin, which may deteriorate an appearance. In addition, the gutter member 96 that is tilted and risen may cause, for example, a wind noise when the vehicle is running.

A need thus exists for a sunroof apparatus which is not susceptible to the drawback mentioned above.

SUMMARY

According to an aspect of this disclosure, a sunroof apparatus includes a supporting bracket configured to support an edge portion of a movable panel in a vehicle width direction, the movable panel opening and closing an opening portion formed at a roof portion of a vehicle, a guide rail configured to be provided at an edge portion of the opening portion and in the vehicle width direction to extend in a vehicle front/rear direction, a sliding member connected to the supporting bracket and driven to be movable along the guide rail in the vehicle front/rear direction, a driving member driving the sliding member and causing a rear portion of the movable panel in a fully-closed state to move upwardly relative to a front portion of the movable panel so that the movable panel moves from the fully-closed state to a tilt-up state, the driving member driving the sliding member, and causing the rear portion of the movable panel in the fully-closed state to move downwardly relative to the front portion of the movable panel so that the movable panel moves from the fully-closed state to a tilt-down state and causing the movable panel to perform a sliding movement in the vehicle rear direction while keeping the movable panel in the tilt-down state, a gutter member which extends in the vehicle width direction and whose end portion in the vehicle width direction is supported at the guide rail to be movable along the guide rail in the vehicle front/rear direction, the gutter member being arranged below a rear edge portion of the movable panel in the fully-closed state, and an engaging/disengaging portion provided at a rear end portion of the movable panel or at a rear end portion of the supporting bracket, the engaging/disengaging portion being disconnected from the gutter member in the fully-closed state and being connected to the gutter member in the tilt-down state.

BRIEF DESCRIPTION OF THE DRAWINGS

The foregoing and additional features and characteristics of this disclosure will become more apparent from the following detailed description considered with the reference to the accompanying drawings, wherein:

FIG. 1A is a lateral view illustrating a first embodiment disclosed here;

FIG. 1B is a cross-sectional view illustrating the first embodiment;

FIG. 2A is a lateral view illustrating a fully-closed state of a movable panel according to the first embodiment;

FIG. 2B is a lateral view illustrating a tilt-down state of the movable panel;

FIG. 2C is a lateral view illustrating the movable panel when performing a sliding movement;

DETAILED DESCRIPTION

A first embodiment disclosed here will be explained with reference to FIGS. 1 and 2. Hereunder, a vehicle front/rear direction is referred to as "front/rear direction", and upward and downward in a vehicle height direction are referred to as "upward" and "downward", respectively. An inner side in a vehicle width direction, which faces toward an inward of a vehicle cabin, is referred to as "vehicle inner side" and an outer side in the vehicle width direction, which faces toward an outward of the vehicle cabin, is referred to as "vehicle outer side".

Figure 5:
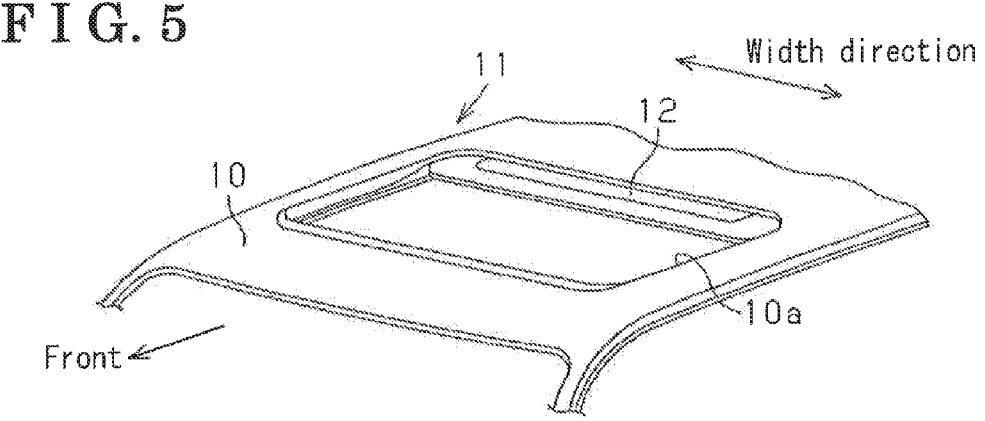
FIG. 5 is a perspective view illustrating a roof of a vehicle according to the first and second embodiments.

As illustrated in FIG. 5, a roof opening portion 10a (i.e., an opening portion) formed in a substantially rectangular shape is provided at a roof 10 (i.e., a roof portion) of a vehicle including, for example, an automobile, and a sunroof apparatus 11 is mounted on the roof 10. The sunroof apparatus 11 is provided with a movable panel 12 which is made of, for example, glass plate and is formed in a substantially rectangular shape. The movable panel 12 moves in the front/rear direction to open and close the roof opening portion 10a.

The movable panel 12 is attached so as to be able to perform a tilt-up movement, a tilt-down movement and a sliding movement. In the tilt-up movement, a rear portion of the movable panel 12 pivots in one direction relative to or about a front portion of the movable panel 12 so as to move upwardly (that is, the rear portion of the movable panel 12 moves upwardly relative to the front portion thereof). In the tilt-down movement, the rear portion of the movable panel 12 pivots in the other direction relative to or about the front portion thereof so as to move downwardly (that is, the rear portion of the movable panel 12 moves downwardly relative to the front portion thereof). In the sliding movement, the movable panel 12 moves to slide in the front/rear direction. The movable panel 12 is a so-called inner sliding roof apparatus. According to the inner sliding roof apparatus, in opening and closing operations of the movable panel 12, the movable panel 12 moves to slide while being maintained in a tilt-down state.

Figure 6:
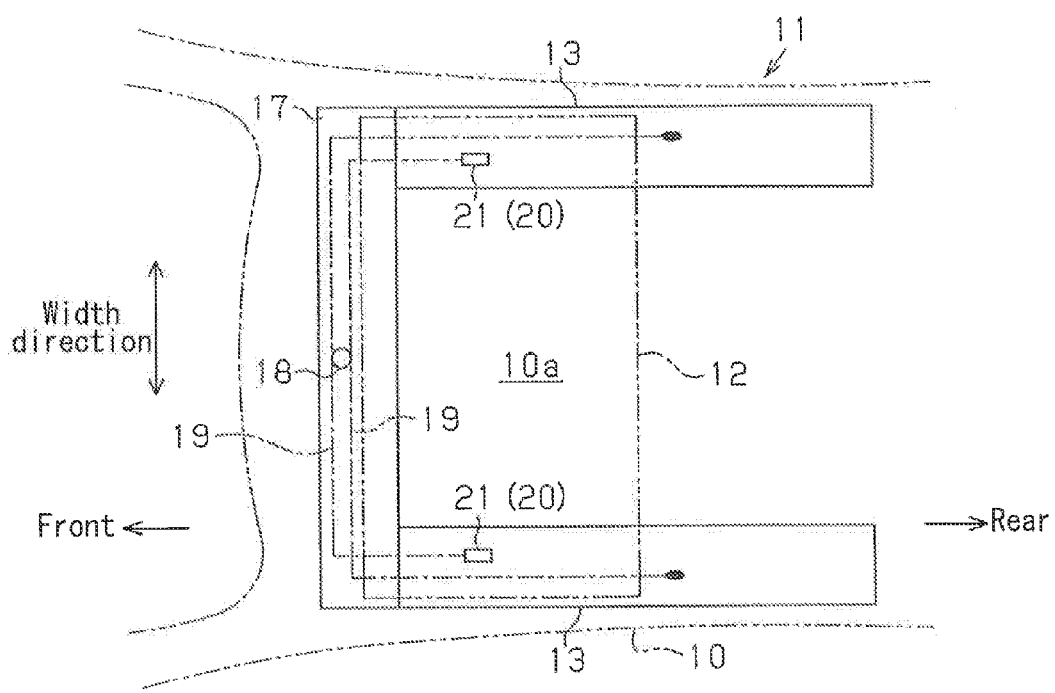
FIG. 6 is a plan view schematically illustrating the roof of the vehicle.

As illustrated in FIG. 6, a guide rail 13 is arranged at each of edge portions of the roof opening portion 10a in the vehicle width direction, that is, the guide rails 13 are provided as a pair. Each of the guide rails 13, which is made of, for example, aluminum alloy extruded material, includes a substantially constant cross section in a lengthwise direction thereof and extends in the front/rear direction. A function part 20 is supported at each of the guide rails 13 and guided thereby so as to be movable in the front/rear direction. The movable panel 12 is connected to each of the function parts 20 and supported thereat in a manner that the movable panel 12 is bridged between the function parts 20.

Further, a housing 17 extending in the vehicle width direction is connected to a front portion of each of the guide rails 13. At an intermediate portion of the housing 17 in a lengthwise direction thereof, an electric drive source 18 (i.e., a driving member) including, for example, an electric motor provided with an output gear is provided. The electric drive source 18 is connected to the function parts 20 via a pair of drive belts 19 (i.e., the driving member) each of which is made of, for example, a resin material and is formed in a substantially band-shape. Thus, the function parts 20 are driven to move in the front/rear direction at the same time with each other.

Next, a structure of the sunroof apparatus 11, which is related to the opening and closing operations of the movable panel 12, will be explained. Basically, the structure related to the opening and closing operations of the movable panel 12 is provided at the sunroof apparatus 11 as a pair at each side of the roof opening portion 10a in the vehicle width direction. Hereunder, the explanation will be made on one of the structures which is provided at one side of the vehicle width direction.

As illustrated in FIGS. 1A and 1B the guide rail 13 is provided at the edge portion of the roof opening portion 10a in the vehicle width direction to extend in the front/rear direction. The guide rail 13 includes a bottom wall 13a which extends in the front/rear direction (that is, the direction that is orthogonal to a paper surface of FIG. 1B) and is formed in a substantially elongated shape. The guide rail 13 includes a pair of vertical wall portions 13b each of which is provided at the bottom wall 13a to stand upwardly so that the pair of vertical wall portions 13b are parallel to each other in the vehicle width direction. The guide rail 13 includes a pair of upper flanges 13c arranged at an upper end of the respective vertical wall portions 13b so that the pair of upper flanges 13c protrude in the vehicle width direction so as to face each other. The guide rail 13 includes a pair of intermediate flanges 13d arranged at an intermediate portion of the respective vertical wall portions 13b in the vehicle height direction so that the pair of intermediate flanges 13d protrude in the vehicle width direction so as to face each other. First protrusions 13e are provided at respective end portions of the intermediate flanges 13d so as to protrude downwardly and to face the bottom wall 13a. Second protrusions 13f are provided at the bottom wall 13a so that the second protrusions 13f protrude upwardly and face the respective first protrusions 13e.

The guide rail 13 includes a first rail portion 14 having a substantially C-shaped cross section opening in the vehicle width direction. More specifically, the bottom wall 13a, each of the vertical wall portions 13b, each of the intermediate flanges 13d, each of the first protrusions 13e and each of the second protrusions 13f cooperate with one another to define the first rail portion 14. Further, the guide rail 13 includes a second rail portion 15 which is above the first rail portion 14 and has a substantially U-shaped cross section opening in the vehicle width direction. More specifically, each of the vertical wall portions 13b, each of the upper flanges 13c and each of the intermediate flanges 13d cooperate with one another to define the second rail portion 15.

Further, the guide rail 13 includes an outer flange 13g which protrudes from the intermediate portion of the vertical wall portion 13b (that is, from among the pair of vertical wall portions 13b, the vertical wall portion 13b positioned at the vehicle outer side) toward the vehicle outer side and which includes a substantially crank-shaped cross section. The outer flange 13g defines a drain portion 16 having a substantially U-shaped cross section, in cooperation with the vertical wall portion 13b that is adjacent to the outer flange 13g.

Lateral edge portions of the movable panel 12 in the vehicle width direction are fixedly supported at the respective function parts 20. As the function parts 20 move along the corresponding guide rails 13 in the front/rear direction, the function parts 20 cause the movable panel 12 to perform the tilt-up movement, the tilt-down movement or the sliding movement.

More specifically, each of the function parts 20 includes a rear shoe 21 (i.e., a sliding member) supported at and guided by the corresponding guide rail 13 so as to be movable along the guide rail 13 in the front/rear direction. Each of the function parts 20 includes a front shoe 22 supported at and guided by the corresponding guide rail 13, at a front side relative to the rear shoe 21, no as to be movable along the guide rail 13 in the front/rear direction. The rear shoe 21 is drivably connected to, for example, an electric motor and is driven or actuated by the electric motor to move along the guide rail 13 in the front/rear direction.

Each of the function parts 20 includes a supporting bracket 23 whose front end portion is connected to the front shoe 22 so as to be rotatable about an axis line extending in the vehicle width direction (that is, the direction that is orthogonal to a paper surface of FIG. 1A). The supporting bracket 23 extends in the front/rear direction and includes a guide hole 23a formed in an elongated hole shape. A supporting pin 25, which is provided at each of the rear shoes 21 and whose central line extends in the vehicle width direction, is inserted in the corresponding guide hole 23a, and thus the supporting bracket 23 is connected to the rear shoe 21 so as to be pivotable relative to the rear shoe 21 and movable along the guide hole 23a in the vehicle front/rear direction. The movable panel 12 is fixedly supported at the function parts 20 at the supporting brackets 23.

An engaging/disengaging portion 26 is provided at a rear end portion of each of the supporting brackets 23. The engaging/disengaging portion 26 is formed in a substantially hooked-shape opening downwardly from an upper portion of the rear end portion of the supporting bracket 23. Further, a pressing portion 27 which is formed in a substantially rectangular shape and which protrudes downwardly is provided at the rear end portion of each of the supporting brackets 23, next to the engaging/disengaging portion 26.

In the fully-closed state of the movable panel 12 as illustrated in FIG. 1A, each of the guide holes 23a is inclined upwardly toward the vehicle rear direction as a whole. In the fully-closed state of the movable panel 12, the supporting pin 25 of each of the rear shoes 21 is positioned in an intermediate portion of the guide hole 23a in a lengthwise direction thereof. Thus, in the fully-closed state of the movable panel 12, when the rear shoe 21 moves along the guide rail 13 in the vehicle front direction, the supporting bracket 23 is pressed upwardly by the supporting pin 25 at the guide hole 23a, and the supporting bracket 23 pivots about the front end portion thereof in the counterclockwise direction when viewed in FIG. 1A. At this time, the movable panel 12 performs the tilt-up movement, that is, the rear portion of the movable panel 12 moves upwardly relative to or about the front portion thereof. In contrast, in the fully-closed state of the movable panel 12, when the rear shoe 21 moves along the guide rail 13 in the vehicle rear direction, the supporting bracket 23 is pressed downwardly by the supporting pin 25 at the guide hole 23a. Accordingly, the movable panel 12 performs the tilt-down movement, that is, the rear portion of the movable panel 12 moves downwardly relative to or about the front portion thereof.

During a tilt movement, that is, tilt-up/tilt-down movement, of the movable panel 12, the front shoe 22 pressed by the supporting bracket 23 is restricted from moving in the front/rear direction by means of a known check mechanism. In a case where the supporting pin 25 reaches an end portion (a rear end portion) of the guide hole 23a as the rear shoe 21 moves along the guide rail 13 in the vehicle rear direction, the tilt-down movement of the movable panel 12 is completed. At this time, the restriction on the movement of the front shoe 22 in the vehicle rear direction, which is executed by the check mechanism, is released. Thus, as the rear shoe 21 moves further in the vehicle rear direction along the guide rail 13, the supporting bracket 23 and the front shoe 22 move in the vehicle rear direction integrally with each other, and the movable panel 12 performs the opening operation while being maintained in the tilt-down state. Accordingly, the movable panel 12 is brought to be in the fully-opened state and the roof opening portion 10a is released or opened.

On the other hand, when the rear shoe 21 moves along the guide rail 13 in the vehicle front direction in the fully-opened state of the movable panel 12, the supporting bracket 23 is restricted from pivoting about the front end portion thereof by means of the check mechanism. Consequently, the supporting bracket 23 and the front shoe 22 move together with each other in the vehicle front direction and the movable panel 12 performs the closing operation while being maintained in the tilt-down state. When the movable panel 12 returns to the state where the tilt-down movement is completed, the check mechanism releases the restriction on the pivoting movement of the supporting bracket 23 and, at the same time the check mechanism restricts the front shoe 22 from moving in the vehicle front/rear direction. Accordingly, while maintaining this state, when the rear shoe 21 moves further in the vehicle front direction along the guide rail 13, the supporting bracket 23 is pressed upwardly by the supporting pin 25 at the guide hole 23a, and thus the movable panel 12 performs the tilt-up movement, that is, the rear portion of the movable panel 12 moves upwardly relative to the front portion thereof, and the movable panel 12 returns to the fully-closed state.

As illustrated in FIG. 1B, a gutter member 30 is arranged above the guide rails 13. The gutter member 30 is made of, for example, a resin material and guides water that drips down from the movable panel 12 to the guide rails 13. More specifically, the gutter member 30 includes a gutter body 31 extending in the vehicle width direction below the movable panel 12 along a rear edge portion of the movable panel 12, and a guide portion 32 extending downwardly from each end portion of the gutter body 31 in the vehicle width direction.

The gutter body 31 is formed in a substantially U-shaped gutter which bridges between the drain portions 16 of the respective guide rails 13 so as to provide a fluid communication in the vehicle width direction. Each of the end portions of the gutter body 31 in the vehicle width direction is inclined downwardly to face the corresponding drain portion 16. Thus, the water dripping from the rear end portion of the movable panel 12 flows through the gutter body 31 and is guided to the drain portions 16.

Each of the guide portions 32 is arranged at the vehicle inner side relative to the drain portion 16 of the corresponding guide rail 13, and includes a configuration that is substantially symmetric (that is, left-right symmetric) in the vehicle width direction. Each of the guide portions 32 includes a pair of shoe portions 32a which are arranged at respective sides of the guide portion 32 in the vehicle width direction. The shoe portions 32a are slidably attached to the respective second rail portions 15 of each of the guide rails 13 so that the gutter member 30 is supported at the guide rails 13 to be movable in the front/rear direction along the guide rails 13. Each of the guide portions 32 is spaced away in the upward direction from the bottom wall 13a of the guide rail 13.

As illustrated in FIGS. 2A to 2C, an engaged/disengaged portion 33 is provided at an intermediate portion of each of the guide portions 32 in the vehicle width direction. The engaged/disengaged portion 33 protrudes from a front end of the guide portion 32 toward the vehicle front and is formed in a substantially rectangular-cylindrical shape which has a closed end and opens upwardly. Each of the engaged/disengaged portions 33 is arranged so as to face the corresponding engaging/disengaging portion 26 of the supporting bracket 23 in the vehicle height direction, and is separated (disconnected) from the engaging/disengaging portion 26 in the vehicle height direction in the fully-closed state of the movable panel 12 as illustrated in FIG. 2A. Similarly, the engaged/disengaged portion 33 is separated from the engaging/disengaging portion 26 in the vehicle height direction in the tilt-up state where the rear portion of the movable panel 12 moves upwardly. On the other hand, as illustrated in FIGS. 2B and 2C, in the tilt-down state where the rear portion of the movable panel 12 moves downwardly (including in a case where the movable panel 12 performs the sliding movement), the engaging/disengaging portion 26 is connected to the engaged/disengaged portion 33 by insertion, and thus a relative movement of the supporting bracket 23 (the movable panel 12) and the gutter member 30 relative to each other in the front/rear direction is locked, that is, restricted. At this time, the gutter member 30 is movable integrally with the supporting brackets 23 and the like along the guide rails 13 in the front/rear direction.

The gutter member 30 is provided with a protruding portion 34 which is formed in a substantially columnar shape and protrudes downwardly from an intermediate portion of each of the guide portions 32 in the front/rear direction. In addition, the gutter member 30 is provided with a first extending portion 35 which is formed in a substantially thin plate shape and extends in the front direction from a lower end of each of the protruding portions 34 (i.e., a first side in the vehicle front/rear direction), and a second extending portion 36 which is formed in a substantially thin plate shape and extends in the rear direction from the lower end of each of the protruding portions 34 (i.e., a second side in the vehicle front/rear direction). Each of the first extending portions 35 and the corresponding second extending portion 36 make up a structure of a plate spring as a whole. An end portion of each of the first extending portions 35 is formed with a pressed portion 35a which is bent upwardly in a substantially rectangular shape so as to face the pressing portion 27 of the corresponding supporting bracket 23, and an end portion of each of the second extending portions 36 is formed with an inserting portion 36a (i.e., a locking portion) which is bent downwardly and faces the bottom wall 13a. As illustrated in FIG. 2A, at the bottom wall 13a, an insertion hole 37 (i.e., a locked portion) is provided. The insertion hole 37 opens in the vehicle height direction and faces the inserting portion 36a when the movable panel 12 is in the fully-closed state. The inserting portion 36a and the insertion hole 37 serve as a fixing mechanism.

Next, an operation according to this embodiment will be explained. In the fully-closed state of the movable panel 12 as illustrated in FIG. 2A, the pressed portion 35a is separated from the pressing portion 27 in the vehicle height direction. On the other hand, the second extending portion 36 is applied with a biasing force so that the inserting portion 36a is pressed against the bottom wall 13a, and accordingly, the inserting portion 36a is inserted in and engaged at the insertion hole 37 provided at the bottom wall 13a in the fully-closed state of the movable panel 12. The same is true in the tilt-up state of the movable panel 12. Thus, when the state of the movable panel 12 is transitioning between the fully-closed state and the tilt-up state, the biasing force is applied to the inserting portion 36a (the second extending portions 36) so that the inserting portion 36a is inserted in the insertion hole 37, and thus the gutter member 30 is fixed to the guide rails 13.

As illustrated in FIG. 2B, when the pressed portion 35a of the first extending portions 35 is pressed by the pressing portion 27 that moves downwardly as the movable panel 12 performs the tilt-down movement, the second extending portion 36 together with the first extending portion 35 experience an elastic deformation so that the inserting portion 36a comes out of the insertion hole 37 against the biasing force. Thus, the gutter member 30 is brought to be movable along the guide rails 13 in the front/rear direction. That is, the portion that is related to the engagement/disengagement of the guide rails 13 and the gutter member 30 relative to each other (that is, the inserting portion 36a) is integral with the portion that is pressed by the supporting bracket 23 that moves downwardly (that is, the pressed portion 35a). The engagement/disengagement of the inserting portion 36a relative to the insertion hole 37 is achieved by the pivoting movement of the first extending portion 35 and the second extending portion 36 about the protruding portion 34 that serves as a point of support according to the principle of leverage. It is noted that the deformation of the resin material is used for the pivoting movement of the first extending portion 35 and the second extending portion 36 (including, for example, the inserting portion 36a) about the protruding portion 34. At this time, because the engaging/disengaging portion 26 that moves downwardly is inserted in the engaged/disengaged portion 33 and is connected thereto, the relative movement of the supporting bracket 23 (the movable panel 12) and the gutter member 30 in the front/rear direction relative to each other is locked or restricted. Consequently, as illustrated in FIG. 2C, the gutter member 30 moves along the guide rails 13 in the front/rear direction in association with the sliding movement of the movable panel 12.

As the movable panel 12 performs the tilt-up movement in order to return to the fully-closed state, the engaging/disengaging portion 26 that moves upwardly comes to be separated from the engaged/disengaged portion 33, and thus the lock or the restriction applied to the relative movement of the supporting bracket 23 (the movable panel 12) and the gutter member 30 relative to each other in the front/rear direction is released. At this time, the pressed portion 35a of the first extending portion 35 is released from the pressing portion 27 that moves upwardly, and thus the first extending portion 35 and the second extending portion 36 experience an elastic return so that the inserting portion 36a comes to be inserted in the insertion hole 37. Thus, the gutter member 30 is fixed or secured to the guide rails 13.

As described above, the following effects and advantages are obtained according to this embodiment. (1) According to this embodiment, the engaging/disengaging portion 26 is separated (disconnected) from the engaged/disengaged portion 33 (the gutter member 30) when the movable panel 12 is in the fully-closed state, and thus the engaging/disengaging portion 26 is separated (disconnected) from the gutter member 30 when the movable panel 12 is in the tilt-up state where the rear portion of the movable panel 12 (the rear end portion of the supporting bracket 23) moves upwardly. Accordingly, while the state of the movable panel 12 is transitioning between the fully-closed state and the tilt-up state, the gutter member 30 keeps the posture thereof, that is, the gutter member 30 is positioned on the guide rails 13, below the rear edge portion of the movable panel 12. Thus, deterioration of an appearance, which is caused because the gutter member 30 is easily seen from the inside/outside of the vehicle cabin, is restricted. On the other hand, the engaging/disengaging portion 26 is connected to the engaged/disengaged portion 33 (the gutter member 30) when the movable panel 12 is in the tilt-down state where the rear portion of the movable panel 12 (the rear end portion of the supporting bracket 23) moves downwardly. Accordingly, the gutter member 30 is movable integrally with the movable panel 12 (the supporting bracket 23) along the guide rails 13 in the front/rear direction when the movable panel 12 performs the sliding movement.

(2) According to this embodiment, in the fully-closed state of the movable panel 12, the gutter member 30 is fixed to the guide rails 13 because the biasing force is applied to the inserting portion 36a so that the inserting portion 36a is brought to be inserted in (engaged with) the insertion hole 37. Thus, it is restricted that the gutter member 30 is displaced on the guide rails 13 due to, for example, an influence of vibrations of the vehicle. On the other hand, when the movable panel 12 is in the tilt-down state, the pressed portion 35a (the gutter member 30) is pressed by the pressing portion 27 (the supporting bracket 23), and therefore the engagement between the insertion hole 37 and the inserting portion 36a is released against the biasing force. Accordingly, the fixation or fastening of the gutter member 30 to the guide rails 13 is released, thereby allowing the gutter member 30 to move in the front/rear direction integrally with the movable panel 12.

(3) According to this embodiment, unlike the known sunroof apparatus, the gutter member 30 does not rise when the movable panel 12 is in the tilt-up state. Accordingly, for example, a wind noise is restricted from occurring when the vehicle is running.

(4) According to this embodiment, the gutter member 30 is configured to be fixed at the guide rails 13 by itself without using other member (the front shoe 22, for example), thus there is no need to provide a connecting member therebetween.

A second embodiment disclosed here will be explained with reference to FIGS. 3 and 4. A structure of the second embodiment differs from the structure of the first embodiment mainly in that the biasing force that causes the locking portion (that is, an inserting portion) to engage with the locked portion (that is, the insertion hole) is applied by an independent biasing member. Therefore, detailed explanations on the structures of the second embodiment that are identical to those of the first embodiment will be omitted.

Figure 3:
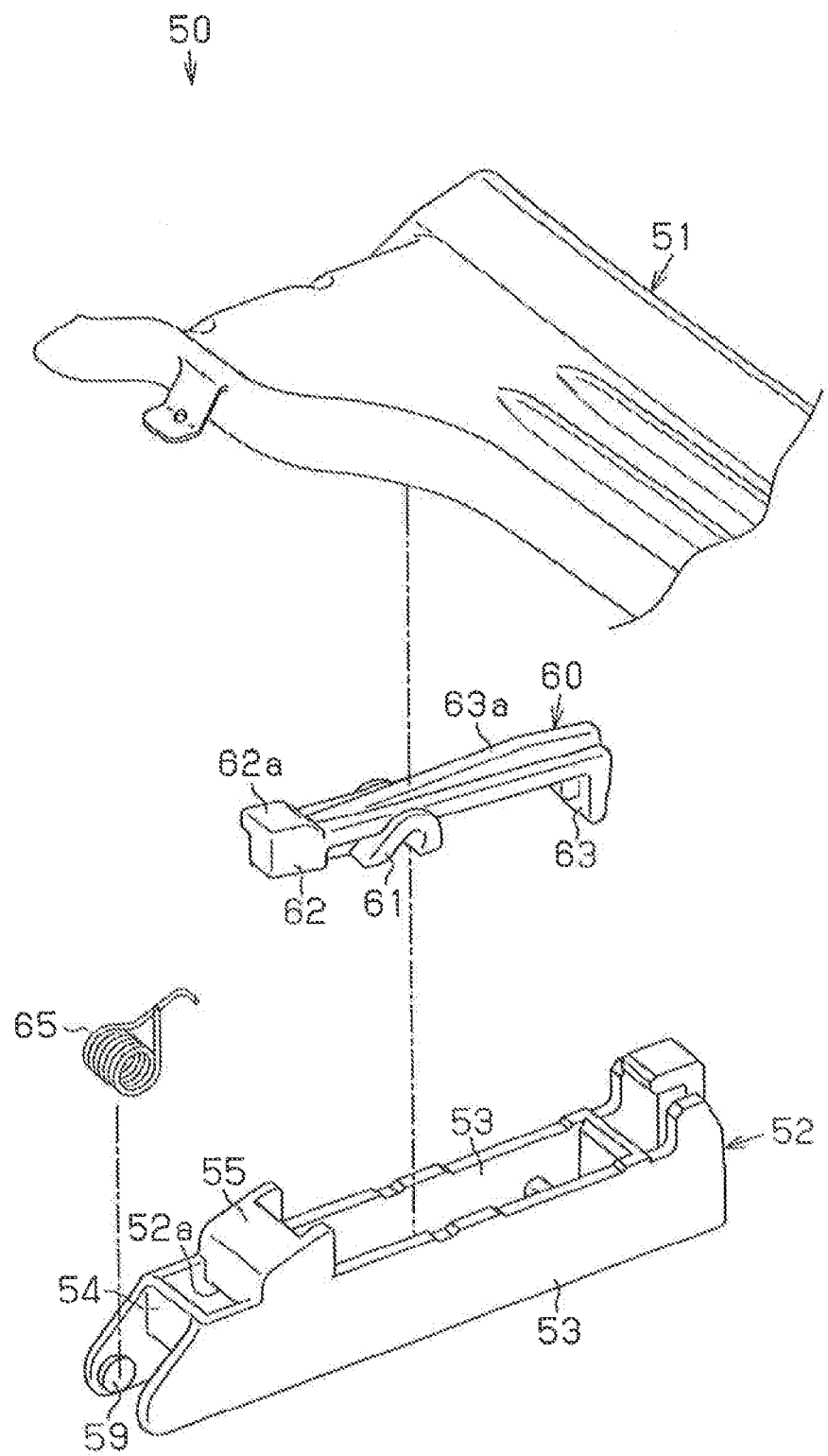
FIG. 3 is an exploded perspective view illustrating a second embodiment disclosed here.
Figure 4:
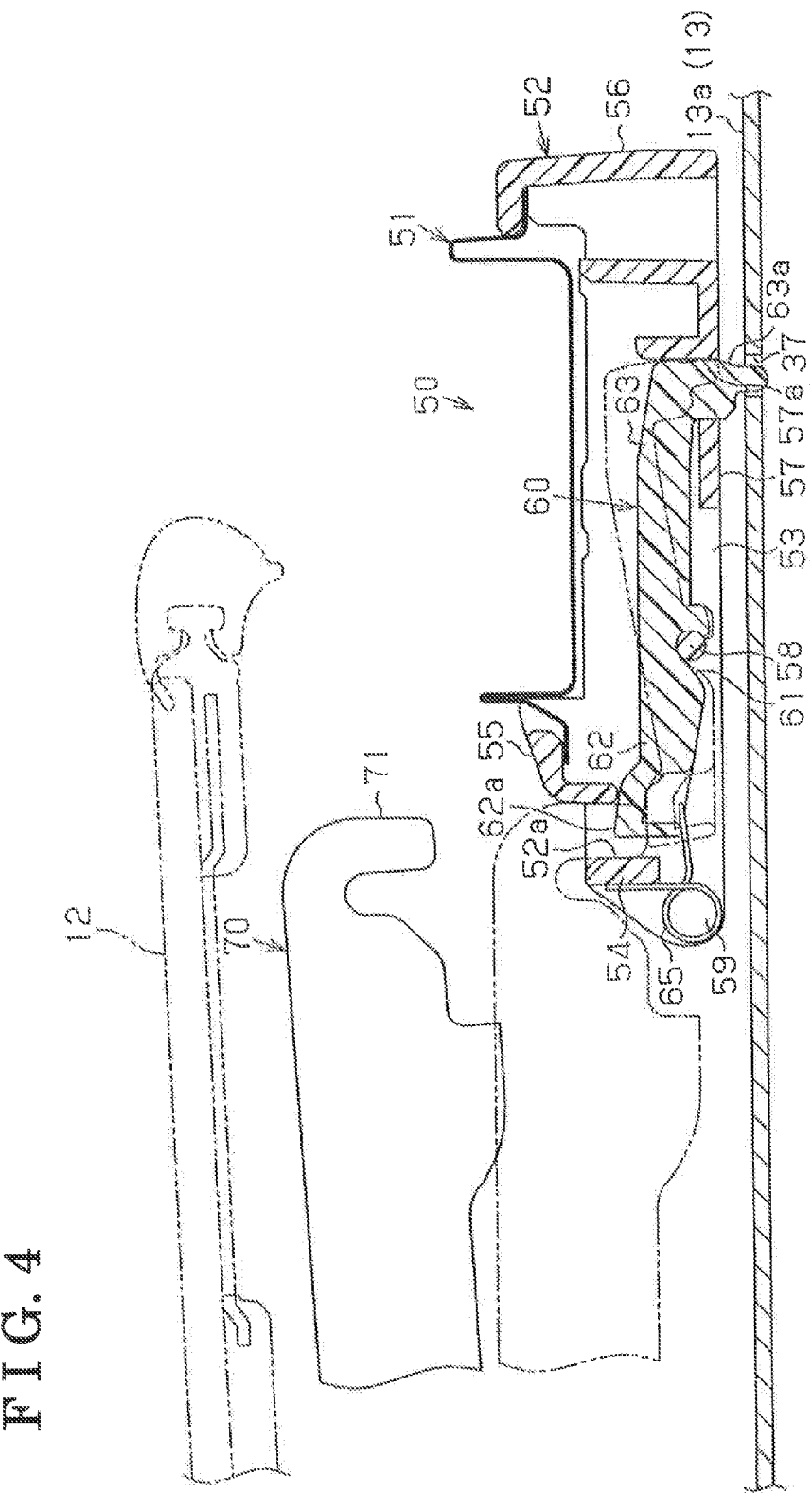
FIG. 4 is a lateral view and a cross-sectional view illustrating the second embodiment.

As illustrated in FIGS. 3 and 4, a gutter member 50 of this embodiment is made of, for example, a resin material. The gutter member 50 includes a gutter body 51 extending in the vehicle width direction below the movable panel 12 along the rear edge portion of the movable panel 12, and a gutter sliding member 52 made of, for example, a resin material and is attached to a lower portion of each of end portions of the gutter body 51 in the vehicle width direction.

In a similar manner to the gutter body 31, the gutter body 51 is formed in a substantially U-shaped gutter which bridges between, that is, bridges across, the drain portions 16 of the respective guide rails 13 in the vehicle width direction so as to provide the fluid communication between the drain portions 16. Each of the end portions of the gutter body 51 in the vehicle width direction is inclined downwardly so as to face the corresponding drain portion 16.

Each of the gutter sliding members 52 includes a configuration that is substantially symmetric (that is, left-right symmetric) in the vehicle width direction. Each of the gutter sliding members 52 is formed in a box shape, for example, a rectangular-box shape opening substantially upwardly. More specifically, each of the gutter sliding members 52 includes a pair of vertical wall portions 53 that are arranged in parallel to each other in the vehicle width direction and a locking wall 54 connecting the vertical wall portions 53 to each other in the vehicle width direction at front upper portions of the respective vertical wall portions 53. Further, each of the gutter sliding members 52 includes a restricting wall portion 55 formed in a substantially L-shape and connecting the vertical wall portions 53 to each other in the vehicle width direction at a vehicle rear side relative to the locking wall 54. At each of the gutter sliding members 52, the locking wall 54, the restricting wall portion 55 and the vertical wall portions 53 cooperate with one another to form or define an engaged/disengaged portion 52a formed in a substantially rectangular-cylindrical shape opening in an up/down direction.

Each of the gutter sliding members 52 includes a connecting wall portion 56 connecting the vertical wall portions 53 to each other in the vehicle width direction at rear ends of the vertical wall portions 53. Each of the gutter sliding members 52 includes a bottom wall portion 57 which is at a vehicle front side relative to the connecting wall portion 56 and connects the vertical wall portions 53 to each other in the vehicle width direction at respective lower ends of the vertical wall portions 53. Further, each of the gutter sliding members 52 includes a support shaft 58 formed in a substantially cylindrical shape and connecting the lower ends of the respective vertical wall portions 53 to each other in the vehicle width direction. More specifically, the support shaft 58 connects intermediate portions, in the front/rear direction, of the respective vertical wall portions 53 to each other, each of the intermediate portions being positioned between the restricting wall portion 55 and the bottom wall portion 57.

Each of the bottom wall portions 57 includes a through hole 57a that opens upwardly and downwardly. A front bottom end of each of the vertical wall portions 53 protrudes in the vehicle front direction relative to the locking wall 54 so as to form or present an inclined configuration, and is provided with a holding protrusion 59 formed in a substantially columnar shape and protruding in the vehicle width direction so that the holding protrusions 59 of the respective vertical wall portions 53, that is, the pair of holding protrusions 59, face each other.

A locking lever 60 formed in a substantially arm-like shape is rotatably connected to each of the gutter sliding members 52 by means of the corresponding support shaft 58. Specifically, a bearing groove 61 formed in a substantially circular-arc shape is provided at a lower portion of a front/rear-intermediate portion of the locking lever 60. The bearing groove 61 opens toward a diagonally-downward and forward direction, and an opening width of the bearing groove 61 is set to be equal to a diameter of the support shaft 58. The locking lever 60 is in slidably contact with the support shaft 58 in a range of the bearing groove 61, that is, the locking lever 60 is slidably contact with the support shaft 58 at the bearing groove 61, and thus is rotatably connected to the gutter sliding member 52. This enhances an assembling performance when the locking lever 60 is assembled onto the gutter sliding member 52 (the support shaft 58) from above.

The locking lever 60 includes a pair of lever protrusions 62, 63 extending in the vehicle front direction and the vehicle rear direction, respectively across the support shaft 58. That is, the support shaft 58 is interposed between the lever protrusions 62 and 63. The lever protrusion 62, which is positioned at the front side, extends to a vicinity of the locking wall 54, and a front end portion of the lever protrusion 62 forms or defines a pressed portion 62a exposed upwardly between the locking wall 54 and the restricting wall portion 55. In the fully-closed state of the movable panel 12 illustrated in FIG. 4, the pressed portion 62a faces an engaging/disengaging portion 71 in the vehicle height direction. The engaging/disengaging portion 71 is protrudingly provided at a rear end portion of a supporting bracket 70 (which serves as an alternative to the supporting bracket 23) and is formed in a substantially hooked shape. On the other hand, the lever protrusion 63, which is positioned at the rear side, extends to the through hole 57a. An inserting portion 63a (i.e., the locking portion) protruding downwardly toward the through hole 57a is provided at a rear end portion of the lever protrusion 63. The inserting portion 63a faces the insertion hole 37 in the vehicle height direction in the fully-closed state of the movable panel 12 as illustrated in FIG. 4. The inserting portion 63a and the insertion hole 37 serve as the fixing mechanism.

In a case where the locking lever 60 rotates or pivots about the support shaft 58 in the clockwise direction when viewed in FIG. 4, the rotation of the locking lever 60 is limited in a range up to a position at which, for example, the pressed portion 62a comes in contact with the restricting wall portion 55 or the lever protrusion 63 comes in contact with a circumferential portion of the through hole 57a. In addition, because the gutter body 51 is attached to the gutter sliding members 52 each supporting the locking lever 60, an opening of the gutter sliding member 52, which opens upwardly, is closed with the gutter body 51. Accordingly, the rotation of the locking lever 60 about the support shaft 58 in the clockwise direction when viewed in FIG. 4 is limited in a range up to a position at which, for example, the lever protrusion 63 comes in contact with the gutter body 51.

Accordingly, the locking lever 60 is slidably in contact with only a part of the support shaft 58 in the range of the bearing groove 61, however the locking lever 60 is rotatably connected to the support shaft 58 without coming off the gutter sliding member 52 or falling off. A biasing member 65 including, for example, a torsion coil spring is held at the holding protrusions 59 of the gutter sliding member 52. A first end of the biasing member 65 is locked at a front surface of the locking wall 54 of the gutter sliding member 52 and a second end of the biasing member 65 is locked at a bottom surface of the pressed portion 62a of the locking lever 60. The biasing member 65 biases or urges the locking lever 60 toward a side or a direction in which the locking lever 60 rotates about the support shaft 58 in the clockwise direction when viewed in FIG. 4, that is, the direction (i.e., a first direction) in which the inserting portion 63a is brought to be inserted into the insertion hole 37.

Next, an operation according to this embodiment will be explained. In the fully-closed state of the movable panel 12 as illustrated in FIG. 4 with the solid lines, the pressed portion 62a is away and separated from the engaging/disengaging portion 71 in the vehicle height direction. On the other hand, the locking lever 60 is applied with the biasing force by the biasing member 65 so that the inserting portion 63a passes through the through hole 57a and is pressed against the bottom wall 13a. Accordingly, the inserting portion 63a is locked, by insertion, at the insertion hole 37 formed at the bottom wall 13a in the fully-closed state of the movable panel 12. The same is true in the tilt-up state of the movable panel 12. Thus, when the state of the movable panel 12 is transitioning between the fully-closed state and the tilt-up state, the biasing force is applied to the inserting portion 63a (the locking lever 60) so that the inserting portion 63a is inserted in the insertion hole 37, and thus the gutter member 50 is fixed to the guide rails 13.

As drawn with double-dotted lines in FIG. 4, when the pressed portion 62a of the locking lever 60 is pressed by the engaging/disengaging portion 71 that moves downwardly as the movable panel 12 performs the tilt-down movement, the locking lever 60 rotates so that the inserting portion 63a comes out of the insertion hole 37 against the biasing force. That is, the locking lever 60 rotates in the direction in which the inserting portion 63a comes out of the insertion hole 37 (i.e., a second direction). Thus, the gutter member 50 is brought to be movable along the guide rails 13 in the front/rear direction. At this time, because the engaging/disengaging portion 71 that moves downwardly is inserted in the engaged/disengaged portion 52a and is connected thereto, the relative movement of the supporting bracket 70 (the movable panel 12) and the gutter member 50 relative to each other in the front/rear direction is locked or restricted. Consequently, the gutter member 50 moves along the guide rails 13 in the front/rear direction in association with the sliding movement of the movable panel 12 that is in the tilt-down state.

As the movable panel 12 operates the tilt-up movement in order to return to the fully-closed state, the engaging/disengaging portion 71 that moves upwardly comes to be separated from the engaged/disengaged portion 52a, and thus the lock or the restriction applied to the relative movement of the supporting bracket 70 (the movable panel 12) and the gutter member 50 relative to each other in the front/rear direction is released. At this time, the pressed portion 62a of the locking lever 60 is released from the engaging/disengaging portion 71 that moves upwardly, and thus the locking lever 60 is rotated by means of the biasing force so that the inserting portion 63a comes to be inserted in the insertion hole 37. Thus, the gutter member 50 is fixed to the guide rails 13.

As described above, the following effects and advantages are obtained according to this embodiment in addition to the effects and advantages that are obtained in the first embodiment. (1) According to this embodiment, the biasing force toward the side or the direction in which the inserting portion 63a is inserted into the insertion hole 37 is applied by the biasing member 65 which is provided separately from the locking lever 60 including the inserting portion 63a and the pressed portion 62a. Accordingly, in the fully-closed state (and the tilt-up state) of the movable panel 12, the gutter member 50 is fixed at the guide rails 13 by means of the inserting portion 63a, with an enhanced reliability.

(2) According to this embodiment, when the inserting portion 63a is brought to be out of the insertion hole 37 in the tilt-down state of the movable panel 12, the engaging/disengaging portion 71 of the supporting bracket 70 is used for pressing the gutter member 50 (the pressed portion 62a). Thus, compared to a configuration where, for example, the gutter member 50 is pressed by a portion of the supporting bracket 70, the portion which is dislocated or shifted relative to the engaging/disengaging portion 71 in the front/rear direction, a space saving of the supporting bracket 70 in the front/rear direction is achieved.

(3) According to this embodiment, because the gutter body 51 and each of the gutter sliding members 52 are provided separately from each other, the gutter sliding members 52 and the like may be commonly used for the gutter bodies 51 having different width dimensions, that is, for example, in a case where the gutter sliding members 52 and the like are applied to a vehicle model provided with the movable panel 12 having a different width dimension.

Figure 7:
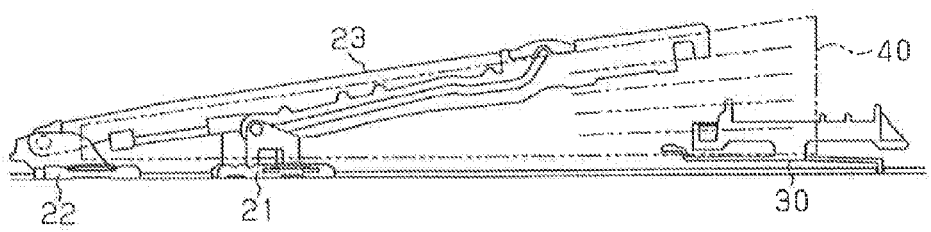
FIG. 7 is a lateral view of a modification or variation of the embodiments, which is seen from an inner side in a vehicle width direction.
Figure 8:
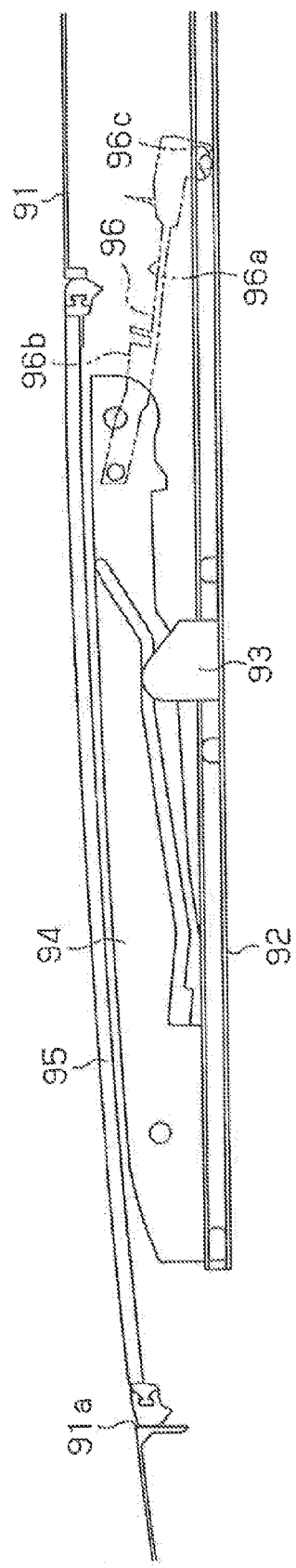
FIG. 8 is a lateral view illustrating part of a known sunroof apparatus.

The aforementioned embodiments may be changed as follows. As illustrated in FIG. 7, a garnish 40 for covering each of the function parts 20 (including, for example, the rear shoes 21) from the vehicle inner side may be provided. The garnish 40 is formed in a bellows-like shape, that is, the garnish 40 is configured to be expanded (unfolded) and contracted (folded)

in the vehicle height direction. Specifically, an upper edge portion of the garnish 40 is fixed to the supporting bracket 23, and a front portion and a rear portion of a lower edge portion of the garnish 40 are fixed to the front shoe 22 and to the gutter member 30, respectively. For example, when the movable panel 12 performs the tilt-up movement and the rear end portion of the supporting bracket 23 moves upwardly, the garnish 40 is expanded in the vehicle height direction in association with the tilt-up movement of the movable panel 12. On the other hand, when the movable panel 12 performs the tilt-down movement and the rear end portion of the supporting bracket 23 moves downwardly, the garnish 40 is contracted or shortened in the vehicle height direction in association with the tilt-down movement of the movable panel 12. As described above, the gutter member 30 is used as a portion at which the lower edge portion of the garnish 40, which is configured to move to expand and contract, is fixedly attached because a posture of the gutter member 30 is maintained substantially as is on the guide rails 13 regardless of the tilt movement of the movable panel 12. Accordingly, there is no need to provide a separate member for fixing the lower edge portion of the garnish 40, for example.

Further, the lower edge portion of the garnish 40 may be fixed only to the gutter member 30 as long as the posture of the gutter member 30 on the guide rails 13 is not affected. In any case, when the movable panel 12 performs the sliding movement, the garnish 40 moves in the front/rear direction integrally with the front shoe 22, the supporting bracket 23 and the gutter member 30.

In the first embodiment, the configuration may be changed so that the gutter member 30 (the pressed portion 35a) is pressed by using the engaging/disengaging portion 26 of the supporting bracket 23 to bring the inserting portion 36a out of the insertion hole 37 in the tilt-down state of the movable panel 12.

In the first embodiment, the first extending portion 35 or the second extending portion 36 may be constituted by, for example, a metal spring. In the first embodiment, the gutter member 30, where the gutter body 31, the guide portions 32 (the shoe portions 32a), the engaged/disengaged portions 33, the protruding portions 34, the first extending portions 35 (the pressed portions 35a) and the second extending portions 36 (the inserting portions 36a) are integral with one another, is used. In contrast, the gutter member may be used, where at least any one or more of the gutter body 31, the guide portions 32 (the shoe portions 32a), the engaged/disengaged portions 33, the protruding portions 34, the first extending portions 35 (the pressed portions 35a) and the second extending portions 36 (the inserting portions 36a) is a separate member from the other members. For example, the guide portions 32 (the shoe portions 32a) may be provided integrally with the second extending portions 36 (the inserting portions 36a) and the like, and the gutter body 31 may be a separate gutter member separated therefrom.

In the first embodiment, the inserting portions 36a are formed at the respective second extending portions 36 and the insertion holes 37 are formed at the respective bottom walls 13a. However, the insertion hole serving as the locking portion may be provided at a rear end portion of the second extending portion 36 and a protrusion serving as the locked portion, which is configured to be inserted in the insertion hole, may be provided at the bottom wall 13a.

In the first embodiment, the inserting portions 36a, which are related to the fixation of the gutter member 30 relative to the respective guide rails 13, and the configuration around the inserting portions 36a may be omitted. That is, the fixation of the gutter member 30 relative to the guide rails 13 may be achieved by means of a holding that is obtained by a frictional force. In this case, the pressed portion 35a and the configuration around the pressed portions 35a may also be omitted.

In the second embodiment, the configuration may be changed so that, in order to bring the inserting portion 63a out of the insertion hole 37 in the tilt-down state of the movable panel 12, the gutter member 50 (the pressed portion 62a) is pressed by the portion of the supporting bracket 70, the portion which is dislocated or shifted relative to the engaging/disengaging portion 71 of the supporting bracket 70 in the front/rear direction.

In the second embodiment, the inserting portion 63a is provided at a rear end portion of the locking lever 60 (the lever protrusion 63) and the insertion hole 37 is provided at the bottom wall 13a. In contrast, the insertion hole serving as the locking portion may be provided at the rear end portion of the locking lever 60 and the protrusion which is configured to be inserted in the insertion hole and serves as the locked portion may be provided at the bottom wall 13a.

In the second embodiment, the biasing member 65 may be, for example, a plate spring. In the second embodiment, the gutter body 51 and the gutter sliding members 52 may be formed integrally with each other.

In the second embodiment, a direction in which the locking lever 60 is assembled relative to the gutter sliding members 52 (the support shafts 58) is not limited to the direction described in the second embodiment. The locking lever 60 may be assembled on the gutter sliding members 52 (the support shafts 58) from below or in the vehicle width direction. In each of the aforementioned embodiments, the engaging/disengaging portion 26, 71 may be provided at the rear end portion of the movable panel 12.

In each of the aforementioned embodiments, the fixing mechanism for fixing the gutter member 30, 50 relative to the guide rails 13 in the fully-closed state of the movable panel 12 and for releasing the fixation of the gutter member 30, 50 relative to the guide rails 13 in the tilt-down state of the movable panel 12 may include an arbitrary configuration.

In each of the aforementioned embodiments, the manner in which each of the rear shoes 21 and the supporting bracket 23, 70 are connected to each other is one example. Contrary to the aforementioned embodiment, for example, the guide hole may be formed at the rear shoe 21 and the supporting pin (which protrudes in a direction opposite to a case where the supporting pin is provided at the rear shoe 21) which is movably inserted in the guide hole may be fixedly provided at the supporting bracket 23, 70.

According to the aforementioned embodiments, the sunroof apparatus 11 includes the supporting bracket 23, 70 configured to support the edge portion of the movable panel 12 in the vehicle width direction, the movable panel 12 opening and closing the roof opening portion 10a formed at the roof 10 of the vehicle, the guide rail 13 configured to be provided at the edge portion of the roof opening portion 10a in the vehicle width direction and to extend in the vehicle front/rear direction, the rear shoe 21 connected to the supporting bracket 23, 70 and driven to be movable along the guide rail 13 in the vehicle front/rear direction, the electric drive source 18 and the drive belts 19 driving the rear shoe 21 and causing the rear portion of the movable panel 12 in the fully-closed state to move upwardly relative to or about the front portion of the movable panel 12 so that the movable panel 12 moves from the fully-closed state to the tilt-up state, the electric drive source 18 and the drive belts 19 both driving the rear shoe 21, and causing the rear portion of the movable panel 12 in the fully-closed state to move downwardly relative to or about the front portion of the movable panel 12 so that the movable panel 12 moves from the fully-closed state to the tilt-down state and causing the movable panel 12 to perform the sliding movement in the vehicle rear direction while keeping the movable panel 12 in the tilt-down state, the gutter member 30, 50 which extends in the vehicle width direction and whose end portion in the vehicle width direction is supported at the guide rail 13 to be movable along the guide rail 13 in the vehicle front/rear direction, the gutter member 30, 50 being arranged below the rear edge portion of the movable panel 12 in the fully-closed state, and the engaging/disengaging portion 26, 71 provided at the rear end portion of the movable panel 12 or at the rear end portion of the supporting bracket 23, 70, the engaging/disengaging portion 26, 71 being disconnected from the gutter member 30, 50 in the fully-closed state and being connected to the gutter member 30, 50 in the tilt-down state.

According to the above-described configuration, the engaging/disengaging portion 26, 71 is disconnected from the gutter member 30, 50 in the fully-closed state, and thus the engaging/disengaging portion 26, 71 is disconnected from the gutter member 30, 50 when the movable panel 12 is in the tilt-up state where the rear portion of the movable panel 12 (the rear end portion of the supporting bracket 23, 71) moves upwardly. Thus, while the state of the movable panel 12 is transitioning between the fully-closed state and the tilt-up-state, the gutter member 30, 50 keeps the posture thereof, that is, the gutter member 30, 50 is arranged on the guide rails 13, below the rear edge portion of the movable panel 12. Accordingly, the deterioration of the appearance, which is caused because the gutter member 30, 50 is easily seen from the inside/outside of the vehicle cabin, is restricted. On the other hand, the engaging/disengaging portion 26, 71 is connected to the gutter member 30, 50 when the movable panel 12 is in the tilt-down state where the rear portion of the movable panel 12 (the rear end portion of the supporting bracket 23, 70) moves downwardly. Thus, the gutter member 30, 50 is movable integrally with the movable panel 12 (the supporting bracket 23, 70) along the guide rails 13 in the front/rear direction when the movable panel 12 performs the sliding movement.

According to the above-described configuration, even in a case where, for example, the movable panel 12 is in the tilt-up state, it is restricted that the gutter member 30, 50 is easily seen from the inside/outside of the vehicle, and thus it is restricted that the appearance is deteriorated.

According to the aforementioned embodiments, the sunroof apparatus 11 includes the inserting portion 36a, 63a and the insertion hole 37 which are for fixing the gutter member 30, 50 relative to the guide rail 13 in the fully-closed state and releasing the fixation of the gutter member 30, 50 relative to the guide rail 13 in the tilt-down state.

According to the above-described configuration, in the fully-closed state, the gutter member 30, 50 is fixed to the guide rails 13. Thus, it is restricted that the gutter member 30, 50 is displaced on the guide rails 13 in the fully-closed state due to, for example, the influence of the vibrations of the vehicle.

According to the aforementioned embodiments, the insertion hole 37 is provided at the guide rail 13 and the inserting portion 36a, 63a is provided at the gutter member 30, 50, the inserting portion 36a, 63a is applied with the biasing force so that the inserting portion 36a, 63a engages with the insertion hole 37 in the fully-closed state, and the inserting portion 36a, 63a disengages from the insertion hole 37 against the biasing force when the gutter member 30, 50 is pressed by the supporting bracket 23, 70 in the tilt-down state.

According to the above-described configuration, in the fully-closed state, the gutter member 30, 50 is fixed to the guide rails 13 because the biasing force is applied to the inserting portion 36a, 63a so that the inserting portion 36a, 63a is brought to be inserted in the insertion hole 37. Thus, it is restricted that the gutter member 30, 50 is displaced on the guide rails 13 due to, for example, the influence of the vibrations of the vehicle. On the other hand, when the movable panel 12 is in the tilt-down state, the gutter member 30, 50 is pressed by the supporting bracket 23, 70, and therefore the engagement between the insertion hole 37 and the inserting portion 36a, 63a is released against the biasing force. Accordingly, the fixation or fastening of the gutter member 30, 50 to the guide rails 13 is released, thereby allowing the gutter member 30, 50 to move in the front/rear direction integrally with the movable panel 12.

According to the aforementioned embodiments, the sunroof apparatus 11 includes the gutter sliding member 52 provided at the end portion of the gutter member 50 in the vehicle width direction and supporting the gutter member 50 in a manner that the gutter member 50 is movable along the guide rail 13 in the vehicle front/rear direction, wherein the inserting portion 63a and the insertion hole 37 (both serving as the fixing mechanism) are provided with the locking lever 60 including the inserting portion 63a and rotatably connected to the gutter sliding member 52, the inserting portion 63a engages with the insertion hole 37 when the locking lever 60 rotates in the direction in which the inserting portion 63a is brought to be inserted into the insertion hole 37 and disengages from the insertion hole 37 when the locking lever 60 rotates in the direction in which the inserting portion 63a comes out of the insertion hole 37, the inserting portion 63a and the insertion hole 37 are provided with the biasing member 65 applying, to the locking lever 60, the biasing force toward the side to which the inserting portion 63a engages with the insertion hole 37, and the inserting portion 63a and the insertion hole 37 are provided with the pressed portion 62a which is provided at the locking lever 60 and is pressed by the supporting bracket 70 so that the inserting portion 63a disengages from the insertion hole 37 in the tilt-down state.

According to the above-described configuration, the biasing force toward the side or the direction in which the inserting portion 63a is inserted into the insertion hole 37 is applied by the biasing member 65 which is provided separately from the locking lever 60 including the inserting portion 63a and the pressed portion 62a. Accordingly, in the fully-closed state, the gutter member 50 is fixed at the guide rails 13 by means of the inserting portion 63a, with the enhanced reliability.

According to the aforementioned embodiments, the supporting bracket 23, 70 presses the gutter member 30, 50 by means of the engaging/disengaging portion 26, 71 and causes the inserting portion 36a, 63a to disengage from the insertion hole 37 in the tilt-down state.

According to the above-described configuration, when the inserting portion 36a, 63a is brought to be out of the insertion hole 37 in the tilt-down state, the supporting bracket 23, 70 presses the gutter member 30, 50 by using the engaging/disengaging portion 26, 71. Thus, compared to the configuration where, for example, the gutter member 30, 50 is pressed by the portion of the supporting bracket 23, 70, the portion which is dislocated or shifted relative to the engaging/disengaging portion 26, 71 in the front/rear direction, the space saving of the supporting bracket 23, 70 in the front/rear direction is achieved.

According to the aforementioned embodiments, the protruding portion 34 is provided at the gutter member 30, the inserting portion 36a and the insertion hole 37 (both serving as the fixing mechanism) are provided with the first extending portion 35 which extends in the front direction from the lower end of the protruding portion 34 and including the pressed portion 35a, and the second extending portion 36 which extends in the rear direction from the lower end of the protruding portion 34, and the fixation of the gutter member 30 relative to the guide rail 13 by means of the second extending portion 36 is released when the supporting bracket 23 presses the pressed portion 35a of the first extending portion 35.

According to the above-described configuration, the fixation of the gutter member 30 relative to the guide rail 13 by means of the second extending portion 36 is released when the engaging/disengaging portion 26 presses the first extending portion 35. That is, the fixation of the gutter member 30 to the guide rail 13, which is achieved by the second extending portion 36, is released by applying the principle of leverage, where the protruding portion 34 serves as a point of support, the first extending portion 35 serves as a power point and the second extending portion 36 serves as a point of action. Accordingly, in a case where, for example, it is difficult to assure a moving distance of the engaging/disengaging portion 26, a distance between the pressed portion 35a and the protruding portion 34 may be set short so as to assure the moving distance of second extending portion 36. In a case where a large force is needed to release the fixation of the gutter member 30 and the guide rails 13 by means of the second extending portion 36, the distance between the pressed portion 35a and the protruding portion 34 may be set long so as to assure the force needed for releasing the fixation.

According to the aforementioned embodiments, the sunroof apparatus 11 includes the garnish 40 whose upper edge portion and lower edge portion are fixedly attached to the supporting bracket 23, 70 and the gutter member 30, 50, respectively, the garnish 40 covering the rear shoe 21 from the vehicle inner side by expanding and contracting in the vehicle height direction in association with the tilt movement of the movable panel 12.

According to the above-described configuration, the gutter member 30, 50 is used as the portion at which the lower edge portion of the garnish 40 is fixedly attached. Accordingly, for example, there is no need to provide the separate member for fixing the lower edge portion of the garnish 40.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunroof apparatus, comprising:
a supporting bracket configured to support an edge portion of a movable panel in a vehicle width direction, the movable panel opening and closing an opening portion formed at a roof portion of a vehicle;
a guide rail configured to be provided at an edge portion of the opening portion in the vehicle width direction and to extend in a vehicle front/rear direction;
a sliding member connected to the supporting bracket and driven to be movable along the guide rail in the vehicle front/rear direction;
a driving member driving the sliding member and causing a rear portion of the movable panel in a fully-closed state to move upwardly relative to a front portion of the movable panel so that the movable panel moves from the fully-closed state to a tilt-up state,
the driving member driving the sliding member, and causing the rear portion of the movable panel in the fully-closed state to move downwardly relative to the front portion of the movable panel so that the movable panel moves from the fully-closed state to a tilt-down state and causing the movable panel to perform a sliding movement in the vehicle rear direction while keeping the movable panel in the tilt-down state;
a gutter member which extends in the vehicle width direction and whose end portion in the vehicle width direction is supported at the guide rail to be movable along the guide rail in the vehicle front/rear direction, the gutter member being arranged below a rear edge portion of the movable panel in the fully-closed state;
an engaging/disengaging portion, the engaging/disengaging portion being disconnected from the gutter member in the fully-closed state and being connected to the gutter member in the tilt-down state;
a fixing mechanism for fixing the gutter member relative to the guide rail in the fully-closed state and releasing the fixation of the gutter member relative to the guide rail in the tilt-down state, wherein
the fixing mechanism includes a locked portion provided at the guide rail and a locking portion provided at the gutter member,
the locking portion is applied with a biasing force so that the locking portion engages with the locked portion in the fully-closed state, and
the locking portion disengages from the locked portion against the biasing force when the gutter member is pressed by the supporting bracket in the tilt-down state; and
a gutter sliding member provided at an end portion of the gutter member in the vehicle width direction and supporting the gutter member in a manner that the gutter member is movable along the guide rail in the vehicle front/rear direction, wherein
the fixing mechanism is provided with a locking lever including the locking portion and rotatable connected to the gutter sliding member, the locking portion engages with the locked portion when the locking lever rotates in a first direction and disengages from the locked portion when the locking lever rotates in a second direction,
the fixing mechanism is provided with a biasing member applying, to the locking lever, a biasing force toward a side to which the locking portion engages with the locked portion, and
the fixing mechanism is provided with a pressed portion which is provided at the locking lever and is pressed by the supporting bracket so that the locking portion disengages from the locked portion in the tilt-down state.

2. The sunroof apparatus according to claim 1, wherein the supporting bracket presses the gutter member by means of the engaging/disengaging portion and causes the locking portion to disengage from the locked portion in the tilt-down state.

3. The sunroof apparatus according to claim 1, further comprising:
a garnish whose upper edge portion and lower edge portion are fixedly attached to the supporting bracket and the gutter member, respectively, the garnish covering the sliding member from a vehicle inner side by expanding and contracting in a vehicle height direction in association with a tilt movement of the movable panel.

4. The sunroof apparatus according to claim 1, wherein the engaging/disengaging portion is provided at a rear end portion of the supporting bracket.

5. The sunroof apparatus according to claim 4, wherein the supporting bracket presses the gutter member by means of the engaging/disengaging portion and causes the locking portion to disengage from the locked portion in the tilt-down state.

6. A sunroof apparatus, comprising:
- a supporting bracket configured to support an edge portion of a movable panel in a vehicle width direction, the movable panel opening and closing an opening portion formed at a roof portion of a vehicle;
- a guide rail configured to be provided at an edge portion of the opening portion in the vehicle width direction and to extend in a vehicle front/rear direction;
- a sliding member connected to the supporting bracket and driven to be movable along the guide rail in the vehicle front/rear direction;
- a driving member driving the sliding member and causing a rear portion of the movable panel in a fully-closed state to move upwardly relative to a front portion of the movable panel so that the movable panel moves from the fully-closed state to a tilt-up state,
- the driving member driving the sliding member, and causing the rear portion of the movable panel in the fully-closed state to move downwardly relative to the front portion of the movable panel so that the movable panel moves from the fully-closed state to a tilt-down state and causing the movable panel to perform a sliding movement in the vehicle rear direction while keeping the movable panel in the tilt-down state;
- a gutter member which extends in the vehicle width direction and whose end portion in the vehicle width direction is supported at the guide rail to be movable along the guide rail in the vehicle front/rear direction, the gutter member being arranged below a rear edge portion of the movable panel in the fully-closed state;
- an engaging/disengaging portion, the engaging/disengaging portion being disconnected from the gutter member in the fully-closed state and being connected to the gutter member in the tilt-down state; and
- a fixing mechanism for fixing the gutter member relative to the guide rail in the fully-closed state and releasing the fixation of the gutter member relative to the guide rail in the tilt-down state, wherein
- a protruding portion is provided at the gutter member,
- the fixing mechanism is provided with a first extending portion provided at a first side in the vehicle front/rear direction relative to the protruding portion and including a pressed portion, and a second extending portion provided at a second side in the vehicle front/rear direction relative to the protruding portion, and
- the fixation of the gutter member relative to the guide rail by means of the second extending portion is released when the supporting bracket presses the pressed portion of the first extending portion.

7. The sunroof apparatus according to claim 6, wherein the engaging/disengaging portion is provided at a rear end portion of the supporting bracket.

\* \* \* \* \*